Feb. 26, 1935.   O. A. ZINKE ET AL   1,992,730
ADJUSTABLE WASHER
Filed June 9, 1934
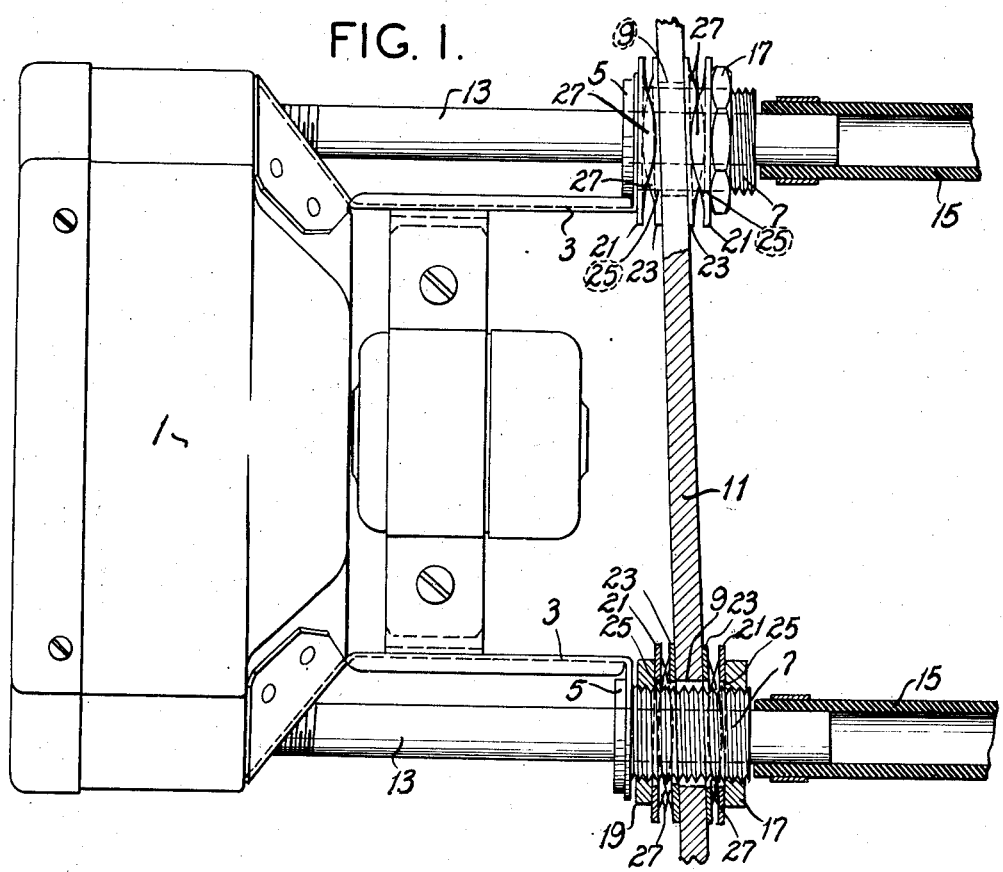
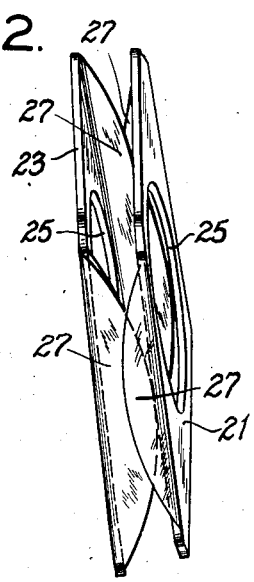
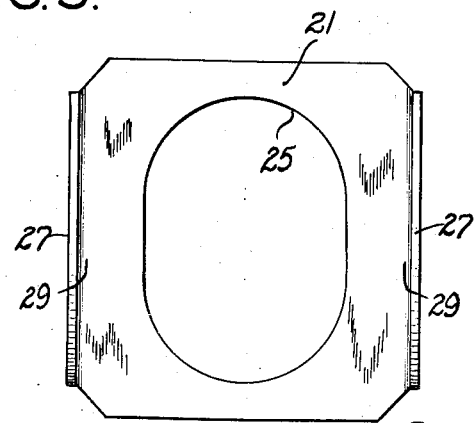

Patented Feb. 26, 1935

1,992,730

UNITED STATES PATENT OFFICE 1,992,730

ADJUSTABLE WASHER

Otto A. Zinke, Des Plaines, and Joseph Y. Grade, Chicago, Ill., assignors to Jackson Auto Radiator Co., Chicago, Ill., a corporation of Illinois Application June 9, 1934, Serial No. 729,878

5 Claims. (Cl. 85—50)

This invention relates to adjustable washers, and with regard to certain more specific features, to load bearing washers of this class.

Among the several objects of the invention may be noted the provision of a washer which permits of the fastening of tubular and like members to plates and the like, the members passing through the plates, provision being made particularly for effecting said fastening where the angle between the plates and tubes is or is not a right angle; the provision of a device of the class described which is adapted to fasten parts of the class described which are located at various angles, without preliminary adjustment or shaping of parts being required in applying the same; and the provision of a device of the class described which is exceedingly simple in form, requiring only simple steps in its fabrication and eliminating factory assembly requirements. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing in which is illustrated one of various possible embodiments of the invention, Fig. 1 is a side elevation of an automotive heater, showing the invention in use for joining said heater to a sloping dashboard of an automobile, parts being broken away to show the invention;

Fig. 2 is a trimetric view showing one unit of the invention; and,

Fig. 3 is a plan view of a single part of the invention.

Similar reference characters indicate corresponding parts throughout the several views of the drawing.

A requirement commonly found in mechanical systems involving piping is that the piping pass through non-right-angular members and be anchored thereto. For instance, there is shown at numeral 1 an automotive heater having brackets 3 carrying flanges 5 from which extend rigid threaded portions 7 adapted to pass through openings 9 in a dashboard 11.

In the present example, the dashboard 11 slopes from the vertical, but it is desired to maintain the threaded extension 7 horizontal, that is to say, the angles between the extensions 7 and the dashboard 11 will not be right angles. The reason for this requirement, in the present instance, is that the face of the heater element 1 should remain vertical, and it is most convenient to apply certain circulating pipes 13 thereto according to a right angular arrangement, said pipes 13 having fastened thereto certain rubber hoses 15 from and to which circulation is effected through the heater 1.

Ordinarily, in order to fasten extensions such as 7, either a single nut 17, as illustrated at the top of Fig. 1, has been used to cooperate clampingly with a flange such as 5, or a nut 17 has been used in cooperation with a second nut or adjustable flange 19, such as shown at the bottom of said Fig. 1. Then special washers have been used with fixed, non-parallel surfaces. The disadvantages of such washers are that they need to be particularly constructed for each angular arrangement between the tube and the plate between which fastening is made. This necessitates either making special washers to suit each situation or to carry an abnormally large stock of the same. The present invention overcomes these difficulties.

Referring to Fig. 2, there are shown at numerals 21 and 23, washer plates. These plates carry elongated openings 25, see in particular Fig. 3 and have sideward flanges 27. The plates 21 and 23 come in pairs, the flanges 27 of plates such as 23 being formed in planes just inside of the planes of flanges 27 of plates such as 21. The plates 21 and 23 thus become what may be termed female and male plates respectively, the rocker flanges of the male plate 23 fitting between the flanges of the female plate 21.

In Fig. 3 only a female plate 21 is shown. The regions 29 on said plate 21 represent bearing areas for cooperating with the lower edges of the rocker flanges 27 of the male plate 23.

The flanges on the male plate 23 contact with the flat part of female plate 21 and take a rocking load; whereas the flanges on the female plate 21 function only as guides for preventing lateral shifting of the male plate. Hence, the flanges on the female plates need not necessarily be arcuately shaped, although this is a convenient way into which to make them. The flanges 27 on the male plate 23 are preferably arcuate to provide the rocker action to be described.

Referring again to Fig. 1, it will be seen that in the case of the upper pipe, the members 5 and 17 may be referred to as clamping members; and in the case of the lower pipe, the members 19 and 17 may be referred to as the clamping members. In each case the clamping members have parallel surfaces.

The invention is put into use by placing between the respective clamping members and opposite sides respectively of the dashboard 11, a pair of the bearing plates 21 and 23. The short axis of each opening 25 is placed in the plane in which the members 13 and 11 are at right angles, the long axis of said opening being in the plane of which said members 13 and 11 are the greatest from a right angle. Then by drawing together the clamping members (5 and 7 on the one hand; 19 and 17 on the other hand), the two pairs of bearing plates 21 and 23 and the dashboard 11 in each case are clamped together, the bearing planes of the respective pairs of plates automatically assuming the proper non-parallel position required. Rocking action between the female plates and the rocker flanges of the male plates provide the motion required to bring this about.

It will be seen that no specialized knowledge is required on the part of the operator to carry out the application of the invention in practice. Furthermore, the manufacturing operation is of the simplest. The plates 21 and 23 may be stamped from a single piece, including flanges 27, the latter being subsequently bent to right angular positions with respect to the planes of the plates.

It will be understood that by elongated opening herein is meant one which has ample clearance between the opening and the extension therethrough at least along one axis and includes the provision of an opening which is too large in all dimensions by the amount that it is desired to accommodate angularity between the members 7 and 11. Thus, although the elongate openings shown in Fig. 3 are to be preferred, it will be understood that a merely oversized opening is the full equivalent thereof. The elongate form of opening is preferable, because it requires the initial positioning of the rocker washer such that the plane of rocking is of maximum effectiveness to take care of the maximum angle between the members 11 and 13.

The invention is particularly applicable to holding two pipes to a common angular member such as said part 11, because absolute rigidity is thereby obtained after piping up the clamping member. If only one pipe were fastened by means of this device, absolute rigidity would not be obtained, because the ability of the rocker washers to permit some rocking action under applied torque to the members fastened.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

1. In apparatus of the class described, a first member having an opening, a threaded extension passing through said opening, a flange on said extension on one side of the opening, a nut threaded to said extension on the other side of the opening, a pair of washers between the flange on the one hand and the first-named member, and a pair of washers on the other hand between said nut and the opposite side of the first-named member, and rocking engaging means between the washers of the respective pairs, said washers having openings therethrough having at least one dimension substantially greater than said extension whereby the washers accommodate themselves to non-right-angular relationships between the first-named member and the extension.

2. In apparatus of the class described, a first member having an opening, a threaded extension passing through said opening, a flange on said extension on one side of the opening, a nut threaded to said extension on the other side of the opening, a pair of washers between the flange on the one hand and the first-named member, and a pair of washers on the other hand between said nut and the opposite side of the first-named member, and rocking engaging means between the washers of the respective pairs, said washers having elongated openings therethrough whereby the washers accommodate themselves to non-right-angular relationships between the first-named member and the extension.

3. In combination, a pair of adapter washers comprising flat plates having openings therethrough of a form adapted to permit of angularity between the plates and any member passing through said openings, cooperating rocker means between the plates, said rocker means comprising arcuate flanges on one plate adapted to rock on the flat portion of the other plate.

4. In combination, a pair of adapter washers comprising flat plates having openings therethrough of a form adapted to permit of angularity between the plates and members passing through said openings, cooperating rocker means between the plates, said rocker means comprising a pair of outer flanges struck up on one plate, a pair of arcuate inside flanges struck up on the other plate, said inside flanges being engageable with the plain surface of the first-named plate and being guided and maintained in a predetermined plane by the flanges on said other plate.

5. A device of the class described comprising a pair of plates, elongated openings in said plates, a pair of arcuate flanges on one of said plates, the lengths of which are substantially parallel to the long axis of the opening in the respective plates, and flanges on the other plate located exteriorly of said first-named flanges and having lengths which are substantially parallel to the long axis of the respective openings, said second-named flanges determining a bearing between said first-named flanges and the adjacent plate.

OTTO A. ZINKE.
JOSEPH Y. GRADE.